United States Patent [19]

Eguchi

[11] Patent Number: 5,030,174
[45] Date of Patent: Jul. 9, 1991

[54] DRIVING MECHANISM AND IMAGE FORMING APPARATUS COMPRISING THE SAME

[75] Inventor: Takeshi Eguchi, Oomiya, Japan

[73] Assignee: Kabushiki Kaisha Toshiba, Kawasaki, Japan

[21] Appl. No.: 497,608

[22] Filed: Mar. 22, 1990

[30] Foreign Application Priority Data

Mar. 24, 1989 [JP] Japan .................. 1-72471

[51] Int. Cl.$^5$ .................. F16G 1/28; G03G 15/00
[52] U.S. Cl. .................. 474/153; 355/210; 474/205; 474/251
[58] Field of Search ........... 474/139, 149, 153, 202, 474/204, 205, 250, 251, 262, 263, 266–268; 355/210, 235, 14 R

[56] References Cited

U.S. PATENT DOCUMENTS

| | | | |
|---|---|---|---|
| 2,514,429 | 7/1950 | Waugh | 474/251 |
| 2,699,685 | 1/1955 | Waugh | 474/251 |
| 3,083,582 | 4/1963 | Wheeler | 474/205 X |
| 3,151,491 | 10/1964 | Case | 474/205 X |
| 4,607,943 | 8/1986 | Yoshioka et al. | 355/210 |
| 4,662,863 | 5/1987 | Sloniewsky et al. | 474/251 |

FOREIGN PATENT DOCUMENTS 62-56646 12/1987 Japan .

*Primary Examiner*—Thuy M. Bui
*Attorney, Agent, or Firm*—Foley & Lardner

[57] ABSTRACT

A driving mechanism includes a timing belt stretched over a plurality of belt pulleys. The timing belt has a first surface provided with a group of teeth and a second surface provided with another group of teeth arranged with a pitch different from that of the group of teeth on the first surface. An image forming apparatus includes a driving mechanism for driving an image carrier or image forming means. The driving mechanism includes a timing belt stretched over a plurality of belt pulleys. The timing belt has a first surface provided with a group of teeth and a second surface provided with another group of teeth arranged with a pitch different from that of the group of teeth on the first surface.

6 Claims, 3 Drawing Sheets

DRIVING MECHANISM AND IMAGE FORMING APPARATUS COMPRISING THE SAME

BACKGROUND OF THE INVENTION

1. Field of the Invention

This invention relates to an improved driving mechanism for transmitting driving force derived from a single power source to a plurality of objects to be driven by the force by a single timing belt. It also relates to an improved image forming apparatus comprising a driving mechanism for transmitting driving force derived from a single power source to a photosensitive drum and image forming means provided around the photosensitive drum by way of a single timing belt.

2. Description of the Related Art

In a conventional image forming apparatus, such as a copying machine or a laser printer or in an automated office machine, a number of components of the apparatus are normally and simultaneously driven by driving force derived from a single power source and transmitted by way of power transmitting means selected from gears, pulleys, chains, wires, timing belts and other elements. Of these power transmitting elements, a chain generates a large noise when it is engaged with a sprocket wheel while a wire slips on pulleys supporting them if the tension applied to it is inadequate, and can be prematurely broken if the abrasion of its surface is accelerated by the slipping action. In order to avoid these problems, there has been proposed a driving mechanism in which a timing belt made of a rubber material such as chloroprene rubber is used in place of a chain or a wire and one or both surfaces of the timing belt is covered with woven nylon cloth which is firmly bonded thereto, a number of teeth being formed thereon for engagement with toothed belt pulleys. A driving mechanism using a timing belt of this type generates only relatively small noises as compared with a driving mechanism using a wire or a chain, and the timing belt does not slip on the toothed belt pulleys.

However, a timing belt on both surfaces of which teeth are formed to engage toothed belt pulleys, as described above, is not free from generating noises on both surfaces of the belt as it abuts the toothed peripheries of the belt pulleys. The noises from the both surfaces of the belt have a same frequency because the pitch of the teeth on one surface of the belt is identical with that of the teeth formed on the other surface. For instance, if the pitch of teeth on each surface of the timing belt is P [mm] and the number of teeth is Z, and if the number of revolutions of each belt pulley is N [rpm], a noise with a frequency of ZN/60 [Hz] is generated from each surface as the teeth on the each surface of the belt abut against the toothed peripheries of the each belt pulley. The teeth abutting noises generated on both surfaces of the belt with an identical frequency are added together so that the peak level of the combined noises becomes larger than that of each sound. Thus, the use of a driving mechanism comprising a timing belt of this type in an office machine such as an image forming apparatus will be inadequate in office areas where such noises can become a nuisance.

SUMMARY OF THE INVENTION

In view of the above problems, it is, therefore, an object of the present invention to provide a driving mechanism using a belt that generates teeth abutting noises of teeth with a considerably reduced peak level during operation and hence can be suitably used for an apparatus to which rigorous anti-noise requirements are applied. Another object of the invention is to provide an image forming apparatus comprising a driving mechanism that generates teeth abutting noises of teeth with a considerably reduced peak level during operation.

According to an aspect of the invention, the first object of the invention is achieved by providing a driving mechanism comprising a belt stretched over a plurality of belt pulleys, the belt having a first surface provided with a group of teeth and a second surface provided with another group of teeth arranged with a pitch different from that of the group of teeth on the first surface.

According to another aspect of the invention, the first object is also achieved by providing a driving mechanism comprising a belt stretched over a plurality of belt pulleys, the belt having a first surface provided with a group of teeth and a second surface provided with another group of teeth which is different in number from the set of teeth on the first surface.

According to still another aspect of the invention, the second object of the invention is achieved by providing an image forming apparatus comprising a driving mechanism for driving an image carrier or image forming means, wherein the driving mechanism comprises a belt stretched over a plurality of belt pulleys, the belt having a first surface provided with a group of teeth and a second surface provided with another group of teeth arranged with a pitch different from that of the group of teeth on the first surface.

With a driving mechanism and an image forming apparatus according to the invention and having a configuration as described above, the teeth abutting noise generated on one surface of the belt when the driving mechanism is in operation has a frequency different from that of the teeth abutting noise generated on the other surface of the belt. Consequently, the teeth abutting noises generated on both surfaces are not added, the peak level of the each noise will be much less than the added noises. Such a driving mechanism can be suitably used in office environment where rigorous anti-noise requirements are applied to office machines including image forming apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrates presently preferred embodiments of the invention and, together with the general description given above and the detailed description of the preferred embodiments given below, serve to explain the principles of the invention.

DETAILED DESCRIPTION OF THE PREFERRED EMBODIMENT

Figure 1:
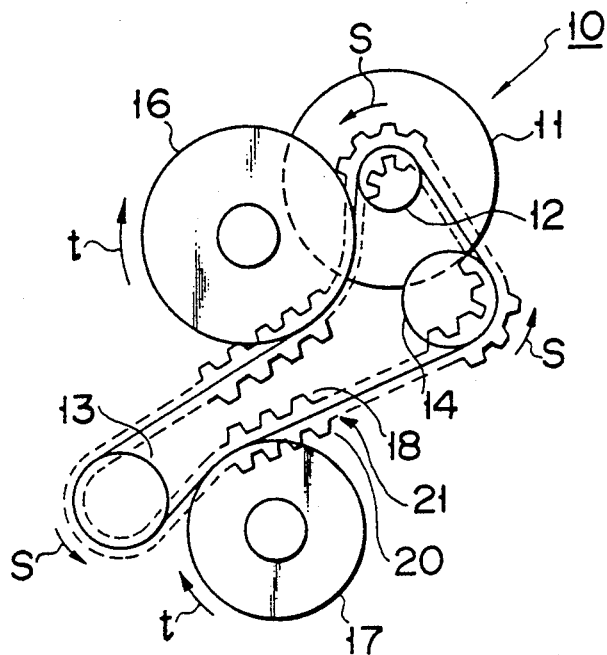
FIG. 1 is a schematic illustration of an embodiment of the driving mechanism of the invention.
Figure 2:
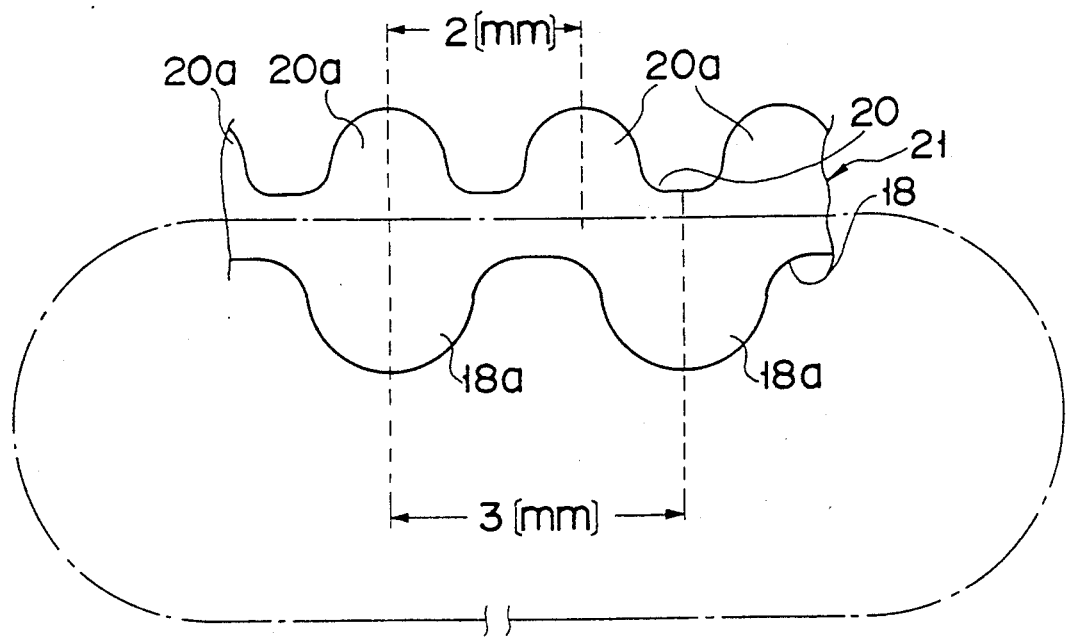
FIG. 2 is an enlarged partial side view of the timing belt used in the embodiment of FIG. 1.

The invention will be described in detail by referring to the accompanying drawings. FIGS. 1 and 2 shows a preferred embodiment of the driving mechanism of the invention. In FIG. 1, the driving mechanism is schematically illustrated and generally indicated by reference numeral 10, reference numeral 11 denotes a motor as a power source and numerals 12, 13, 14 respectively denote a motor gear, a first tension gear and a second tension gear, the gears 12, 13 and 14 forming a first group of gears with a pitch of 3 [mm]. Reference numerals 16 and 17 respectively denote a first and second timing gears, the gears 16 and 17 forming a second group of gears with a pitch of 2 [mm]. On the first group of gears 12, 13 and 14, a 420 [mm] long endless timing belt 21 is wound. A first surface (inner surface) 18 of the timing belt 21 is provided with a first group of teeth 18a in which 140 teeth with a pitch of 3 [mm] are included. Each of the second group of gears abuts a second surface (outer surface) 20 of the endless timing belt 21. A second set of teeth 20a includes 210 teeth with a pitch of 2 [mm] formed on said second surface 20.

The timing belt 21 of this embodiment is formed by molding rubber on an elongated core of glass fiber, aramide fiber such as Kevlar (trade mark) or a similar material. The motor gear 12 is made of polycarbonate, while the tension gears 13, 14 as well as the first and second timing gears 16, 17 are made of polyacetal.

The driving mechanism 10 having an arrangement as described above operates in the following manner. When the motor 11 is activated and the motor gear 12 is rotated in the counterclockwise direction as indicated by arrow s, the timing belt 21 which is engaged with the gear is driven at a speed of N [rpm]. Consequently, the first and second tension gears 12, 13 on which the timing belt 21 is wound are rotated in the counterclockwise direction indicated by arrow s, whereas the first and second timing gears 16, 17 which abut on the outer surface of the timing belt 21 are rotated in the clockwise direction indicated by arrow t. In this state, the teeth abutting noise is generated from the both surfaces 18, 20 of the timing belt 21 because the two groups of gears 12, 13, 14 and 16, 17 each abut the toothed peripheries of the first and second surfaces 18, 20 of the timing belt 21. However, because the pitch and the number of the first group of teeth 18a formed on one surface 18 of the timing belt 21 are different from those of the second group of teeth 20a formed on the other surface 20, the teeth abutting noise generated on one surface 18a have a frequency of 140N/60 [Hz] and the teeth abutting noise generated on the other surface have a frequency of 210N/60 [Hz] which is different from the frequency of the noise of one surface. As a result, the peak level of the two noises will not be combined each other, so that the peak levels of the noises will not increased and any possibility that the driving mechanism can become a source of nuisance is eliminated.

In this embodiment, since the two groups of teeth having different pitches from each other are formed on the both surfaces of the timing belt 21, different components can be driven at different speeds by the single belt. Moreover, since the frequency of the teeth abutting noises generated on both surfaces of the belt are different from each other, the peak levels of the two noises will not be combined with each other, so that noises generated when the mechanism is activated are reduced and uncomfortable sounds disappear. The driving mechanism is suitable for use in office equipment which is required to be noise free from nuisance.

Figure 3:
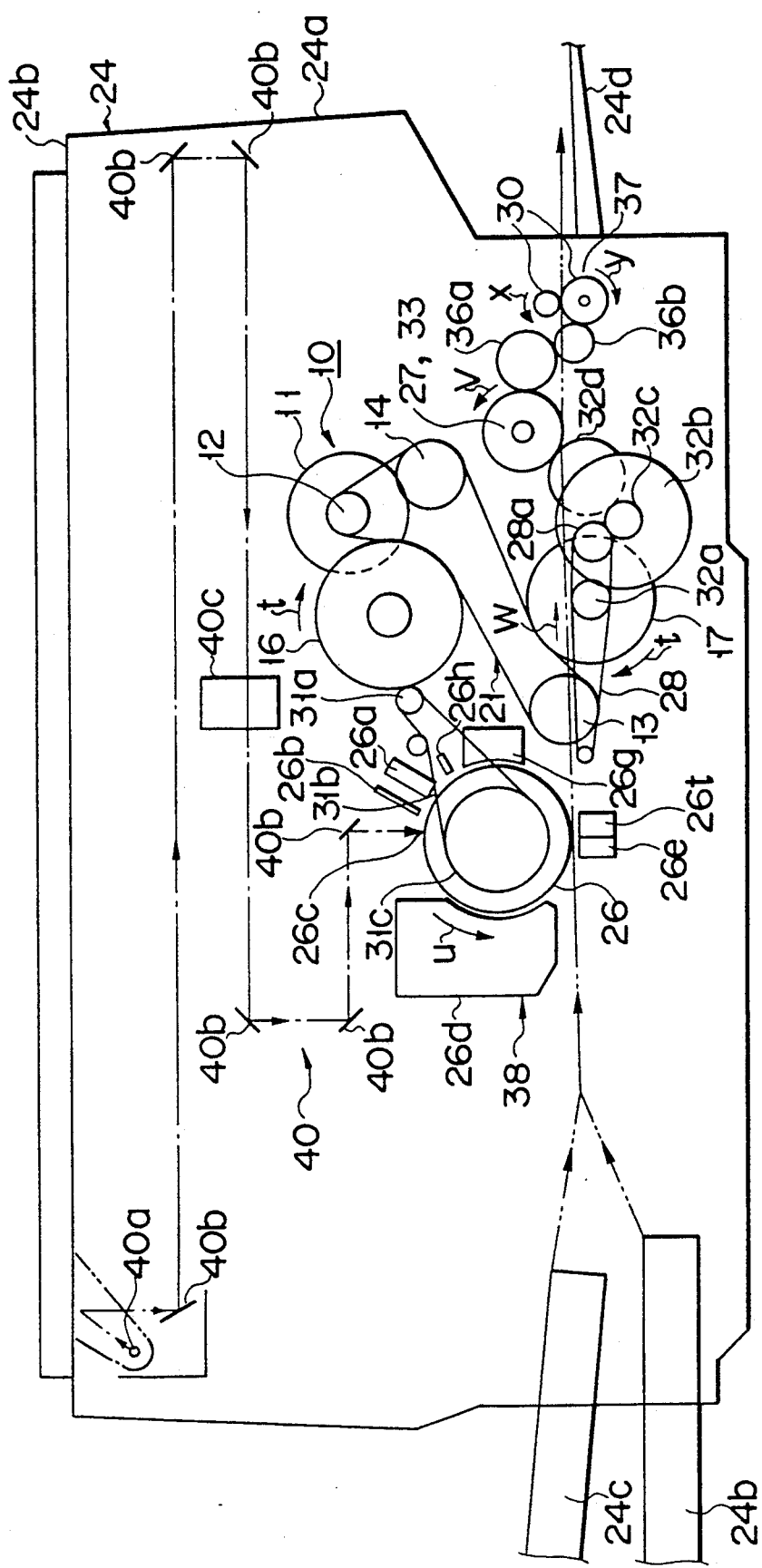
FIG. 3 is a schematic illustration showing essential part of an embodiment of the image forming apparatus of the invention.
Figure 4A:
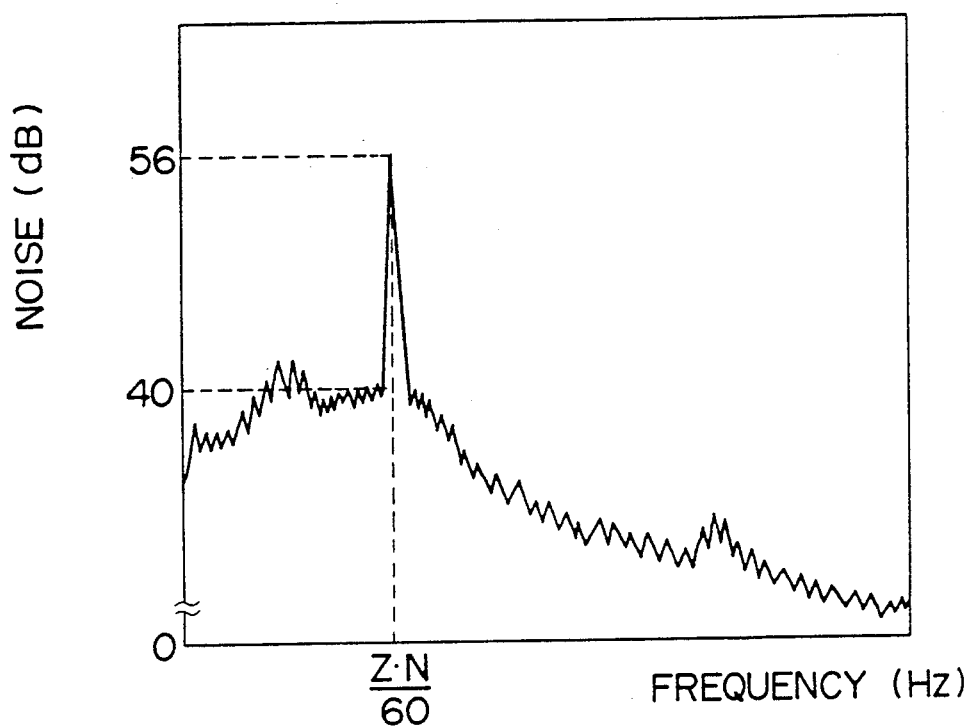
FIG. 4A is a schematic illustration showing the noise generated by a conventional image forming apparatus.
Figure 4B:
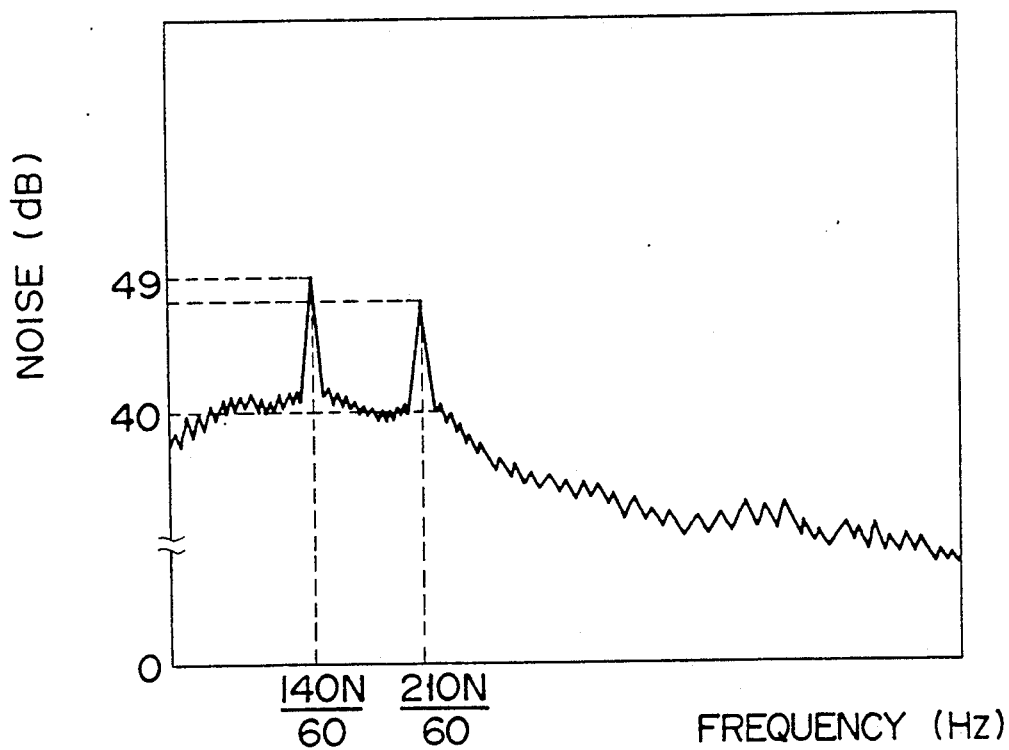
FIG. 4B is a schematic illustration showing the noise generated by the embodiment of the image forming apparatus of the invention.

Now an image forming apparatus according to the invention will be described by referring to FIGS. 3, 4A and 4B illustrate a preferred embodiment. The same components as that of the driving mechanism described above are denoted by the same reference numerals as those in FIGS. 1 and 2.

FIG. 3 schematically illustrates essential parts of the driving mechanism of the image forming apparatus 24. In this embodiment, the image forming apparatus is a copying machine. A first timing gear 16 of the driving mechanism 10 of the image forming apparatus drives a photosensitive drum 26 as an image carrying member. A second timing gear 17 of the driving mechanism 10 drives a heat roller 27, a conveyor belt 28 and a pair of paper-discharging rollers 30, which are part of the image forming apparatus.

The first timing gear 16 engages a first drum pulley 31a, and the first drum pulley 31a transmits a rotational force to the photosensitive drum 26 by way of a drum belt 31b wound over the first drum pulley 31a and a second drum pulley 31c coaxially fixed to the photosensitive drum 26. The second timing gear 17 transmits a rotational force to a heat roller gear 33 coaxially fixed to the heat roller 27 by way of first through fourth roller pulleys 32a, 32b, 32c, 32d. The third roller pulley 32c meshes with a conveyor belt driving gear 18a for driving the conveyor belt 28. The heat roller gear 33 transmits a rotational force to a paper-discharging roller gear 37 for driving the paired paper-discharging rollers 30 by way of first and second transmission gears 36a, 36b.

In the above described image forming apparatus which is a copying machine, a main charger 26a, an erasing unit 26b, an exposure position 26c, a developing device 26d, a transferring unit 26e, a separating unit 26f, a cleaning unit 26g and a deelectrification unit 26h are arranged around the photosensitive drum 26 in the above described order to construct image forming means 38.

In a housing 24a of the apparatus, an exposure unit 40 is further arranged. The unit 40 reads out an image from an original placed on an original table 24b mounted on an upper surface of the housing 24 and optically transfers the image to the exposure position 26c. The exposure unit 40 comprises a lamp 40a for projecting light on the image formed on the surface of the original tightly pressed against the original table 24b and a plurality of mirrors 40b, as well as lens means 40c for guiding the light reflected from the image formed surface of the original to the exposure position 26c, as indicated by one-dot chain line. Since the constructions of the exposure unit 40 and the image forming means 38 are well known, they will not be described here any further.

Now an image forming apparatus as described above operates in the following way. When a copy button (not shown) for starting an image forming operation is depressed, a cooling fan (not shown) is rotated by a main motor (not shown) housed in the housing 24a, while the image forming means 38 and the exposure unit 40 are also set to work. At the same time, the motor 11 of the driving mechanism 10 drives the timing belt 21, which meshes with the motor gear 12, at a speed of N [rpm] as in the case of the driving mechanism of the above described embodiment, so that the first and second timing gears 16, 17 rotate in the clockwise direction indicated by arrow t. Then rotation of the first timing gear 16 is transmitted to the photosensitive drum 26 by way of the first drum pulley 31a, the drum belt 31b, and the second drum pulley 31c to cause the photosensitive drum 26 to rotate in the counterclockwise direction indicated by arrow u. Similarly, rotation of the second timing gear 17 is transmitted to the heat roller 17 by way of the first through fourth roller pulleys 32a through 32d and the heat roller gear 33 to cause the heat roller 17 to rotate in the counterclockwise direction indicated by arrow v. Further, the conveyor belt 28 is driven by the conveyor belt drive gear 28a in the direction indicated by arrow w, while the paired paper-discharging rollers 30 are driven by the transmission gears 36a, 36b and the paper-discharging roller gear 37 respectively in the directions indicated by arrows x and y. As the photosensitive roller 26 is rotated in the manner as described above, the image forming means 38 forms a toner image by developing a latent image formed on the photosensitive drum 26 by the exposure unit 40 and transfers the toner image onto a paper sheet, fed from the sheet feeding cassette 24b or 24c attached on one end surface of the housing 24a, by means of the transferring unit 26e. The image-transferred paper sheet is then conveyed to the heat roller 27 by the conveyor belt 28 to fix the toner image on the paper sheet, and then the image-fixed paper sheet is discharged onto a discharged paper tray 24d attached on the other end surface of the housing 24a by the paired paper-discharging rollers 30.

During the operation, teeth abutting noises are generated from the both surfaces 18, 20 of the timing belt 21 as the gears 12, 13, 14, 16, 17 abut against the belt. However, the noise generated on one surface 18 has a frequency of 140N/60 [Hz] and the noise generated on the other surface 20 has a frequency of 210N/60 [Hz]. Therefore, the two groups of noises do not reach an unbearable level because the peak levels of the both groups are not arithmetically added if the timing belt 21 is continuously driven.

The inventor of the present invention conducted an experiment using a photocopying machine manufactured by Toshiba Corporation and provided with a timing belt according to the invention and obtained the data as described below. FIGS. 4A and 4B comparatively show the result of the experiment.

When the machine was operated by using a conventional timing belt that carries teeth on both surfaces with a same pitch and a same number, the combined noises generated from the belt showed a peak value of 56 [dB] which is by far above the average level of 40 [dB] as clearly illustrated in FIG. 4A. On the contrary, when the machine was operated by using a timing belt according to the invention in place of a conventional belt, the noise generated on one surface 18 with a frequency of 140N/60 [Hz] showed a peak value of 49 [dB] and those generated on the other surface 20 with a frequency of 210N/60 [Hz] showed a peak value of 48 [dB] as illustrated in FIG. 4B, the two peaks appearing with different timing so that the height of the peaks are reduced to approximately a half of that of the peak of FIG. 4A. Accordingly the annoyance or nuisance level caused by noises of a timing belt according to the invention is far lower than that of the nuisance caused by a conventional timing belt.

Since the timing belt 21 of the embodiment of the image forming apparatus of the invention carries teeth with different pitches and numbers on the surfaces 18, 20 of the belt, it can simultaneously and effectively drive different components including the photosensitive drum 26, the heat roller 27, the conveyor belt 28 and the delivery roller pair 30. Moreover, since the noise generated on one surface 18 has a frequency which is different from that of the noise generated on the other surface 20, so that peaks of the two noises will not combined each other, the peak value of the each noise is within acceptable level without causing any unbearable nuisance even in office environment where rigorous requirements are applied to automated office machines including copying machines. Therefore an image forming apparatus according to the invention can never constitute a threat to amenity.

It may be needless to say that, while the present invention was described above by referring to preferred embodiments thereof, it is not limited thereto by any means. For instance, the pitches as well as the numbers of teeth formed on both surfaces of the timing belt of a driving mechanism according to the invention may be varied so long as they are different from each other. The number of gears that engage the timing belt, and the manner with which they are arranged, can be also varied in different ways. Besides, the pitch and the number of each of the gears that are engaged with the timing belt can be varied in accordance with the pitch and the number of the teeth carried on the surface of the belt with which it meshes. Moreover, a driving mechanism according to the invention may be applied not only to office machines but also to home equipment of various types The timing belt in an image forming apparatus according to the invention may be used to simultaneously drive a variety of devices contained in the apparatus such as the photosensitive drum and the original table.

Additional advantages and modifications will readily occur to those skilled in the art. Therefore, the invention in its broader aspects is not limited to the specific details, and representative devices shown and described. Accordingly, various modifications may be made without departing from the spirit or scope of the general inventive concept as defined by the appended claims and their equivalents.

What is claimed is:

1. A driving mechanism comprising:
    at least three belt pulleys, one of which has a first group of teeth and a first pitch at its peripheral surface, the other one having a second group of a different number of teeth and a second pitch at its peripheral surface, and the remaining one of which has one of the first group of teeth and the second group of teeth at its peripheral surface;
    a belt stretched over the belt pulleys having first and second surfaces on which a first group of teeth, having the same pitch as that of the first group of teeth of the one pulley, and a second group of teeth, having the same pitch as that of the second group of teeth of the other pulley, are provided; and
    means for driving the belt by any of the belt pulleys.
2. The driving mechanism of claim 1, in which the first group of teeth includes 140 teeth, and a pitch of 3, and the second group of teeth includes 210 teeth and a pitch of 2.

3. An image forming apparatus comprising:
means for forming an image on an image carrying member and for recording the image on a recording means;
at least three belt pulleys, one of which having a first group of 140 teeth and a pitch of 3 at its peripheral surface, the other one of which having a second group of 210 teeth and a pitch of 2 at its peripheral surface, the remaining one of which having one of the first group of teeth and the second group of teeth at its peripheral surface, and any one of which connected at least one of the image carrying member and the image forming means;
a belt stretched over the belt pulleys having first and second surfaces on which a first group of teeth, having the same pitch as that of the first group of teeth of the one pulley, and a second group of teeth, having the same pitch as that of the second group of teeth of the other pulley, are provided; and
a power source for driving the belt by way of any one of the belt pulleys.

4. An image forming apparatus comprising:
means for forming an image on an image carrying member and for recording the image on a recording means;
at least three belt pulleys, one of which having a first group of teeth with a certain pitch at its peripheral surface, the other one of which having a second group of teeth with a pitch different from that of the first group of teeth at its peripheral surface, the remaining one of which having one of the first group of teeth and the second group of teeth at its peripheral surface, and any one of which connected at least one of the image carrying member and the image forming means;
a belt stretched over the belt pulleys having first and second surfaces on which the first group of teeth and the second group of teeth are provided;
a power source for driving the belt by way of any other one of the belt pulleys; and
the pitch of the first group of teeth and that of the second group of teeth being so selected that the belt generates two sounds different in frequency from each other between the first and second surfaces thereof and the pulleys contacted thereto when the power source drives the belt.

5. A noise suppressing gear drive mechanism comprising:
a driving belt having a tooth surface on each face thereof, the tooth pitch on one face being different from that on the other face;
at least two toothed driven gears, one gear having a tooth pitch corresponding to that of one face of the belt and the other toothed gear having a tooth pitch corresponding to the tooth pitch on the other face of the driving belt, each gear being positioned in driving contact with the belt; and
means for causing the rotation of the belt, thereby to actuate rotation of the gears, the two pitches being different, so that any noise created by the engagement of the gear with one tooth surface do not accumulate with any noise generated by the engagement of the other gear with the other tooth surface.

6. The driving mechanism of claim 5, wherein the driving gears and driving belt are made of a plastic material.

* * * * *